(12) United States Patent
Lien et al.

(10) Patent No.: US 8,692,814 B2
(45) Date of Patent: Apr. 8, 2014

(54) ELECTROMAGNETIC POINTER

(75) Inventors: Chien-Chia Lien, Hsin-Chu (TW);
Cheng-Lu Liu, Hsin-Chu (TW)

(73) Assignee: Waltop International Corporation, Hsinchu (TW)

( * ) Notice: Subject to any disclaimer, the term of this patent is extended or adjusted under 35 U.S.C. 154(b) by 653 days.

(21) Appl. No.: 12/831,628

(22) Filed: Jul. 7, 2010

(65) Prior Publication Data

US 2011/0175854 A1   Jul. 21, 2011

(30) Foreign Application Priority Data

Jan. 15, 2010   (TW) ............................... 99200807 U

(51) Int. Cl.
*G06F 3/033*   (2013.01)

(52) U.S. Cl.
USPC ......................................................... 345/179

(58) Field of Classification Search
USPC .................. 345/179, 156, 173, 174, 180; 178/19.01, 18.01–18.03, 19.02–19.04; 362/118
See application file for complete search history.

(56) References Cited

U.S. PATENT DOCUMENTS

| | | | | |
|---|---|---|---|---|
| 6,252,182 B1 * | 6/2001 | Lai | ............................... | 178/19.04 |
| 7,154,481 B2 * | 12/2006 | Cross et al. | .................... | 345/173 |
| 7,897,885 B2 * | 3/2011 | Tsai | ............................ | 178/19.01 |
| 2001/0038384 A1 * | 11/2001 | Fukushima et al. | .......... | 345/179 |
| 2004/0125089 A1 * | 7/2004 | Chao et al. | ..................... | 345/179 |
| 2005/0140663 A1 * | 6/2005 | Nakamura | ..................... | 345/179 |

* cited by examiner

*Primary Examiner* — Pegeman Karimi

(74) *Attorney, Agent, or Firm* — Muncy, Geissler, Olds & Lowe, P.C.

(57) ABSTRACT

An electromagnetic pointer is disclosed. The electromagnetic pointer comprises a pen holder assembly, a circuit board, a metal rod, a ferrite core with coils and a trigger device. The diameter of the pen holder assembly is less than 6 mm. The circuit board comprises a resonance circuit. The metal rod has a low permeability. The ferrite core with coil constitutes an inductor and the coil electrically connects to the circuit board through a conductive wire to complete the resonance circuit. The ferrite core has a hollow center so that the metal rod can move through to trigger the trigger device and change electric properties of the resonance circuit.

16 Claims, 3 Drawing Sheets

ELECTROMAGNETIC POINTER

FIELD OF THE INVENTION

The present invention relates to an electromagnetic pointer, and more particularly to a batteryless electromagnetic pointer for e-books/green books.

DESCRIPTION OF THE PRIOR ART

Input apparatuses or electronic appliances such as digitizer tablets or e-books/green books include a plurality of antennas or sensor coils forming a sensing plane arranged under a work surface of the digitizer tablet or a screen of the e-book, and a pointer for a user to operate the input apparatuses or electronic appliances. The coordinates of the pointer are obtained through the transmitting and receiving of electromagnetic waves between the circuit of the pointer and the antennas or the sensor coils.

The circuit of the pointer including electromagnetic pens or styluses usually comprises an inductor, a capacitor and relative components enclosed in a case. The inductor constituted by a ferrite core winded with a metal coil and the capacitor constitute the circuit to transmit and receive electromagnetic waves with the antennas or sensor coils. The frequency variation of the circuit is achieved via changing the capacitance and the inductance so that the design of the pointer can choose either the inductor or capacitor to be variable or adjustable according to the requirement. For most input apparatuses such as digitizer tablets, the size of the pointer, particularly the diameter of the pointer, is not specifically required small and has a similar size with ordinary pens for writing. In stead, the pointer must have a relative larger size than that of the ordinary pens for enclosing necessary circuit and components. However, for electronic appliances such as e-books/green books with a limited thickness which have to accommodate the pointer inside, the size of the pointer, particularly the diameter of the pointer, must be small enough for being accommodated inside the e-books/green books.

In order to meet the requirement of accommodating the pointer inside the e-books/green books with a limited thickness without altering the functions, the configuration of inductors, capacitors, relative components and internal mechanism of conventional pointers must be changed. However, the configuration of inductors, capacitors, relative components and internal mechanism of conventional pointers can not be effectively reduced in size by conventional techniques owing to the size limitation of the ferrite core and the insufficient strength of the plastic pen axis component, etc.

In order to solve the above-mentioned drawbacks of the manufacture and configuration design of conventional pointer, the invention provides an electromagnetic pointer to overcome the problems of size limitation and insufficient strength of material.

SUMMARY OF THE INVENTION

An object of the present invention is to provide an electromagnetic pointer with a joint movable mechanism using a metal rod as the control mechanism of the electromagnetic pointer. The metal rod triggers a switch device to change the signal emitted from the electromagnetic pointer. The electromagnetic pointer overcomes the drawback of unable to make the diameter less than 6 mm of the conventional batteryless electromagnetic pointer.

According to the object, one embodiment of the present invention provides an electromagnetic pointer having a metal rod, a resonance circuit and a trigger device. The resonance circuit has a ferrite core with a coil winding the ferrite core to form a inductor and at least one capacitor, the metal rod penetrates trough the ferrite core and is moveable through the ferrite core. The metal rod triggers the trigger device to change electric properties of the resonance circuit

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

DESCRIPTION OF THE PREFERRED EMBODIMENT

The detailed description of the present invention will be discussed in the following embodiments, which are not intended to limit the scope of the present invention, but can be adapted for other applications. While drawings are illustrated in details, it is appreciated that the scale of each component may not be expressly exactly.

Figure 1A:
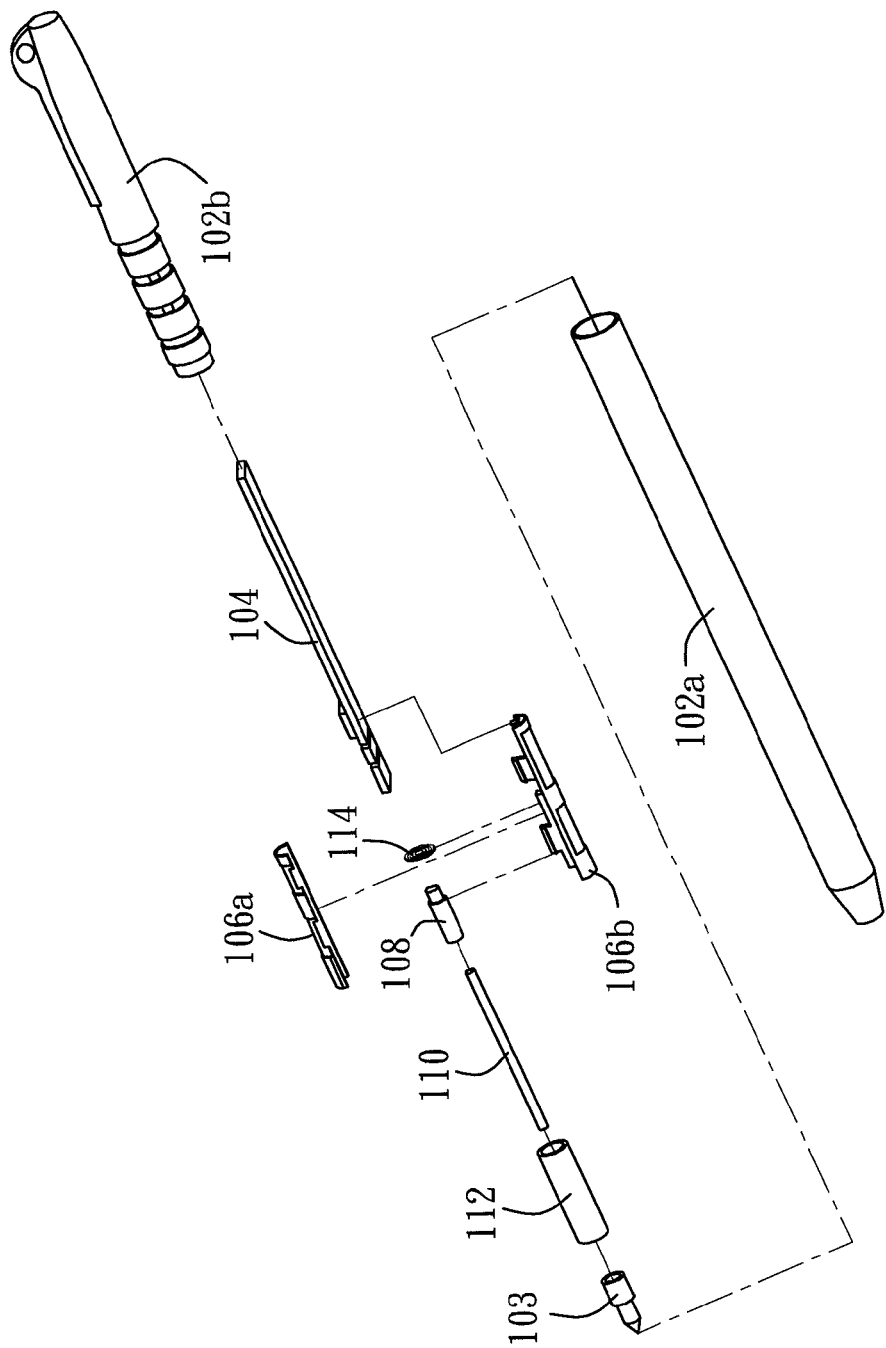
FIG. 1A shows an exploded view of an electromagnetic pointer of one embodiment of the invention.

FIG. 1A shows an exploded view of an electromagnetic pointer of one embodiment of the invention. The electromagnetic pointer comprises a pen holder assembly including housings 102a and 102b, a tip 103, a circuit board 104, a metal rod 110, a ferrite core 112 and a trigger device. The pen holder assembly including housings 102a and 102b comprises hollow components made of non metal materials to accommodate the circuit board 104, the metal rod 110, the ferrite core 112 and the trigger device, wherein the diameter of the housings 102a and 102b is less than about 6 millimeter, and is preferably about 5.5 millimeter, but not limited to 5.5 millimeter. The circuit board 104 comprises a printed circuit board, a resonance circuit and devices on the printed circuit board a pen holder assembly, a circuit board, a metal rod, a ferrite core with a coil and a trigger device. The diameter of the pen holder assembly is less than 6 mm. The circuit board comprises a resonance circuit. The metal rod has a low permeability. The ferrite core with a coil constitutes an inductor and the coil electrically connects to the circuit board through a conductive wire to complete the resonance circuit. The ferrite core has a hollow center so that the metal rod can move through to trigger the trigger device and change the inductance or capacitance of the resonance circuit so that the electromagnetic pointer can resonate with the antennas and sensor coils of the input apparatuses such as e-books or digital tablets. The metal rod 110 comprises a metal rod with a low permeability ($\mu$). The ferrite core 112 and a coil winding the ferrite core 112 (not shown) constitute an inductor, and the coil connects to the circuit board 104 via conductive lines to form a resonance circuit. The ferrite core 112 has a hollow center with an inner diameter slightly lager the diameter of the metal rod 110 so that the metal rod 110 can penetrate and slide through the ferrite core 112. The trigger device comprises fixing components 106a and 106b, a guide component 108, a switch device 114. The back end of the metal rod 110 penetrating the ferrite core 112 is put to be enclosed in the guide component 108. The guide component 108 and the switch device 114 are enclosed inside the combination of the fixing components 106a and 106b. The switch device 114 contacts the circuit board 104 and the tip 103, the circuit board 104, the metal rod 110, the ferrite core 112 and the trigger device are accommodated and fixed in the housings 102a and 102b. The tip 103, the metal rod 110, the guide component 108 and the switch device 114 constitute a joint movable mechanism. The switch device 114 comprises a flat spring with a tray shape. When one end of the metal rod 110 is sheathed in the guide component 108 and contacts the flat spring, the center of the flat spring contacts a trigger point at one side of the circuit board 104 to trigger and complete the circuit on the circuit board 104 and change the inductance or capacitance of the resonance circuit. Since the tip 103 is attached on the front end of the metal rod 110, the metal rod 110 penetrates through the center of the ferrite core 112, the back end of the metal rod 110 is sheathed in the guide component 108, the switch device 114 is pushed or triggered by the push of the guide component 108 and the movement of the metal rod 110 through the center of the ferrite core 112 to trigger and complete the circuit on the circuit board 104 and change the electric properties of the resonance circuit such as the variation of frequency resulting from the change of the capacitance when the tip 103 contact the surface of the input apparatus. If the tip 103 does not contact the surface of the input apparatus, the metal rod 110 penetrating the center of the ferrite core 112 will not slide and the guide component 108 will not push the switch device 114 to change the connection status of the devices of the resonance circuit and thus change the frequency.

Figure 1B:
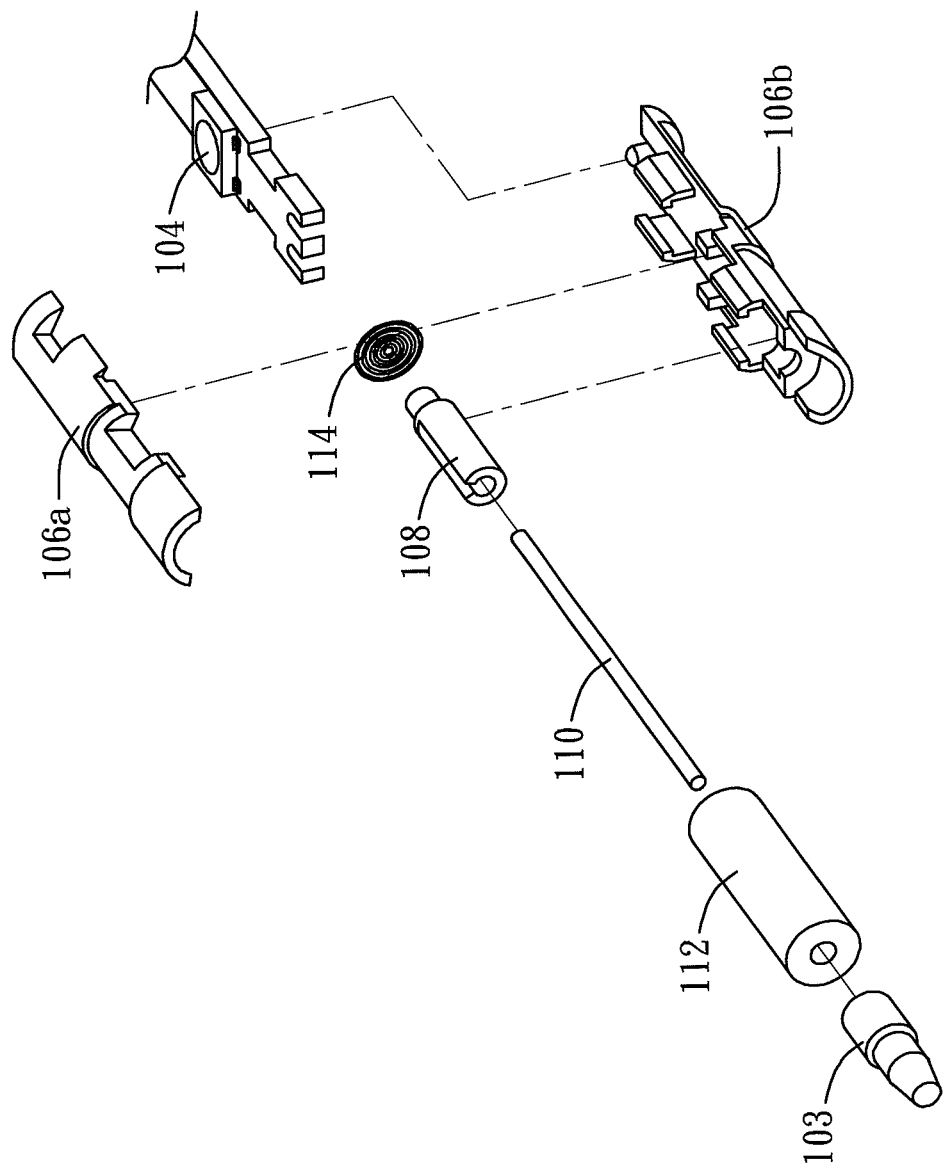
FIG. 1B shows a further exploded view of the joint movable mechanism of the electromagnetic pointer of one embodiment of the invention.

FIG. 1B shows a further exploded view of the joint movable mechanism, the trigger structure and the fixing components of the electromagnetic pointer of one embodiment of the invention. The tip 103 is attached on the front end of the metal rod 110, the metal rod 110 penetrates through the center of the ferrite core 112, the back end of the metal rod 110 is sheathed in the guide component 108, the guide component 108 is used to contact and push the switch device 114 to trigger and complete the circuit on the circuit board 104 and change the inductance or capacitance of the resonance circuit when the tip 103 is pressed to push the metal rod 110.

Figure 1C:
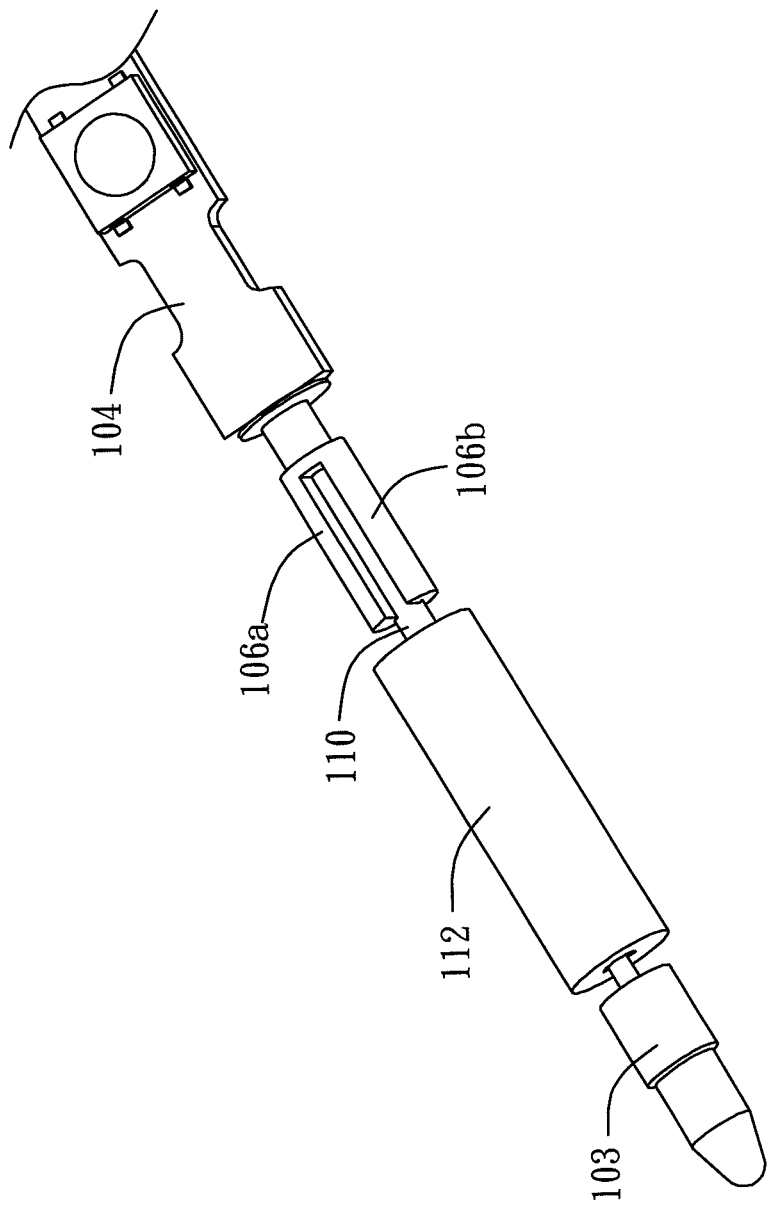
FIG. 1C shows the assembled structure of the joint movable mechanism of the electromagnetic pointer of one embodiment of the invention.

FIG. 1C shows the assembled structure of the joint movable mechanism of the electromagnetic pointer of one embodiment of the invention. The guide component 108 and the back end of the metal rod 110 are enclosed inside the fixing components 106a and 106b. The switch device 114 is pushed by the tip 103, the metal rod 110 and the guide component 108 to change the status of connection of the resonance circuit of the circuit board 104. The of material of the metal rod 110 is preferably a metal with a low permeability ($\mu$) in order to prevent unnecessary variation of the electromagnetic field induced by the inductor constituted by the ferrite core 112 winded with the metal coil. Referring to FIG. 1A, since the diameter of the housings 102a and 102b is less than about 6 mm, a polymer material comprising epoxy resin can be filled into the space of the housing 102a after the circuit board 104, the metal rod 110, the ferrite core 112 and the trigger device are packed into the housing 102a to reinforce the structure of the electromagnetic pointer.

In one embodiment of the invention, the electromagnetic pointer utilizes a metal rod penetrating the center of a ferrite core and a metal coil and a guide component to push or trigger a switch device so as to change the inductance or capacitance and frequency of the resonance circuit and to meet the requirement of pointer of an input apparatus or an electronic appliance and to overcome the problems of the size limitation and the insufficient strength of the material of the conventional pointer manufacture. Therefore, the electromagnetic pointer of the invention can be used in input apparatuses or electronic appliances such as e-books.

Although specific embodiments have been illustrated and described, it will be appreciated by those skilled in the art that various modifications may be made without departing from the scope of the present invention, which is intended to be limited solely by the appended claims.

What is claimed is:

1. An electromagnetic pointer, said electromagnetic pointer comprising:
   a metal rod;
   a circuit board having at least one capacitor thereon, two contacts and one trigger point at one side of the circuit board, wherein the trigger point is between the contacts and is not connected to the contacts;
   a ferrite core with a coil winding the ferrite core to form an inductor, the coil electrically connecting to the circuit board to form a resonance circuit, the metal rod penetrating trough the ferrite core and being moveable through the ferrite core;
   a spring, the spring contacting the contacts, the spring is configured to be able to be pushed by the metal rod to contact the trigger point so as to connect the contacts and the trigger point through the spring to change electric properties of the resonance circuit and complete a circuit on the circuit board; and
   a pen holder assembly accommodating the metal rod, the circuit board, the ferrite core with the coil, and the trigger device.

2. The electromagnetic pointer according to claim 1, wherein the coil connects to the circuit board via conductive lines.

3. The electromagnetic pointer according to claim 1, wherein the metal rod pushes the spring to change the capacitance of the resonance circuit resulting in variation of frequency of the resonance circuit.

4. The electromagnetic pointer according to claim 1 further comprising a polymer material filled into a space between the circuit board, the metal rod, the ferrite core with the coil and the spring in the pen holder assembly.

5. The electromagnetic pointer according to claim 4, wherein the polymer material comprises epoxy resin.

6. The electromagnetic pointer according to claim 1, wherein the diameter of the pen holder assembly is less than about 6 mm.

7. The electromagnetic pointer according to claim 1, wherein one end of the metal rod is sheathed into a tip and the other end of the metal rod is sheathed into a guide component for pushing the spring.

8. The electromagnetic pointer according to claim 1, wherein the electromagnetic pointer is used in e-books.

9. An electromagnetic pointer, said electromagnetic pointer comprising:
   a metal rod;
   a resonance circuit having a ferrite core with a coil winding the ferrite core to form an inductor and at least one capacitor of a circuit on a circuit board and two contacts and one trigger point at one side of the circuit board, the metal rod penetrating trough the ferrite core and being moveable through the ferrite core, wherein the trigger point is between the contacts and is not connected to the contacts; and
   a spring, the spring contacting the contacts, the spring is configured to be able to be pushed by the metal rod to contact the trigger point so as to connect the contacts and the trigger point through the spring to change electric properties of the resonance circuit and complete the circuit on the circuit board.

10. The electromagnetic pointer according to claim 9 further comprising a pen holder assembly accommodating the metal rod, the resonance circuit, and the spring.

11. The electromagnetic pointer according to claim 10, wherein the diameter of the pen holder assembly is less than about 6 mm.

12. The electromagnetic pointer according to claim 10 further comprising a polymer material filled into a space between the metal rod, the resonance circuit and the spring in the pen holder assembly.

13. The electromagnetic pointer according to claim 12, wherein the polymer material comprises epoxy resin.

14. The electromagnetic pointer according to claim 9, wherein the metal rod pushes the center of the spring to change the electric properties of the resonance circuit.

15. The electromagnetic pointer according to claim 9, wherein the metal rod triggers the spring to change the capacitance of the resonance circuit resulting in variation of frequency of the resonance circuit.

16. The electromagnetic pointer according to claim 9, wherein the electromagnetic pointer is used in e-books.

* * * * *